US011418059B2

(12) United States Patent
Richter

(10) Patent No.: US 11,418,059 B2
(45) Date of Patent: Aug. 16, 2022

(54) WIRELESS POWER TRANSFER CONTROL

(71) Applicant: Delta Electronics (Thailand) Public Co., Ltd., Samutprakarn (TH)

(72) Inventor: Ulrich Richter, Freiburg (DE)

(73) Assignee: DELTA ELECTRONICS (THAILAND) PUBLIC CO., LTD., Samutprakarn (TH)

( * ) Notice: Subject to any disclaimer, the term of this patent is extended or adjusted under 35 U.S.C. 154(b) by 0 days.

(21) Appl. No.: 16/267,015

(22) Filed: Feb. 4, 2019

(65) Prior Publication Data

US 2019/0267841 A1 Aug. 29, 2019

(30) Foreign Application Priority Data

Feb. 28, 2018 (EP) .................................... 18159218

(51) Int. Cl.
*B60L 53/12* (2019.01)
*H02J 50/12* (2016.01)
(Continued)

(52) U.S. Cl.
CPC .............. *H02J 50/12* (2016.02); *B60L 53/12* (2019.02); *H02J 7/00* (2013.01); *H02J 7/0026* (2013.01); *H02J 50/80* (2016.02)

(58) Field of Classification Search
CPC .... H02J 50/12; H02J 7/00; H02J 50/80; H02J 7/0026; H02J 50/00; H02J 7/025; B60L 53/12; B66B 7/00
See application file for complete search history.

(56) References Cited

U.S. PATENT DOCUMENTS 9,270,138 B2 * 2/2016 Yamakawa ........... H01M 10/44
2009/0001941 A1 * 1/2009 Hsu ......................... H02J 50/12 323/211
(Continued)

FOREIGN PATENT DOCUMENTS

DE 10101988 A1 * 7/2002 ............. H02H 9/041
EP 2 312 722 A2 4/2011
(Continued)

OTHER PUBLICATIONS

European Search Report dated Jun. 9, 2020, 5 pages.
European Search Report dated Jul. 30, 2018.

*Primary Examiner* — Daniel Cavallari
(74) *Attorney, Agent, or Firm* — Vector IP Law Group LLC; Robert S. Babayi

(57) ABSTRACT

The invention concerns a wireless power transfer arrangement (1) including a primary side (2) and a secondary side (3) where the primary side includes an input stage (5) for converting an input power to an AC primary output and a primary resonator (6) for receiving the AC primary output and inducing a magnetic field (9) for wireless power transfer through an air gap (8). The secondary side (3) includes a secondary resonator (10) for converting the power received through the magnetic field (9) to an AC secondary output and an output stage (11) for converting the AC secondary output to a DC secondary output. A controller (15) is adapted to control independently of each other a frequency of the AC primary output to be at a resonance frequency of the resonators and the power transferred from the primary side (2) to the secondary side (3) by controlling the voltage or the current of the AC primary output. By locking the frequency of the system to the resonance frequency enables any easy power control simply by controlling the current or the voltage of the primary resonator (5).

24 Claims, 3 Drawing Sheets

(51) Int. Cl.
*H02J 7/00* (2006.01)
*H02J 50/80* (2016.01)

(56) References Cited

U.S. PATENT DOCUMENTS

2016/0114692 A1* 4/2016 Tripathi ................ H02J 7/0021 320/109
2017/0203656 A1* 7/2017 Okamoto ................ H02J 50/12
2017/0222488 A1 8/2017 Madawala et al.
2017/0366046 A1 12/2017 Werner
2018/0034506 A1* 2/2018 Moore ................. H04B 5/0093
2018/0212477 A1* 7/2018 Misawa .................. B60L 53/39
2018/0241337 A1* 8/2018 Zou ......................... B60L 50/51
2019/0020210 A1* 1/2019 Partovi ................. H02J 7/0047
2020/0280190 A1* 9/2020 Lehn ....................... H02J 3/322
2021/0066966 A1* 3/2021 Nomura .................. H02J 50/80

FOREIGN PATENT DOCUMENTS

EP 2 822 147 A1 1/2015
EP 3 280 029 A1 2/2018
JP H06 76971 A 3/1994

* cited by examiner

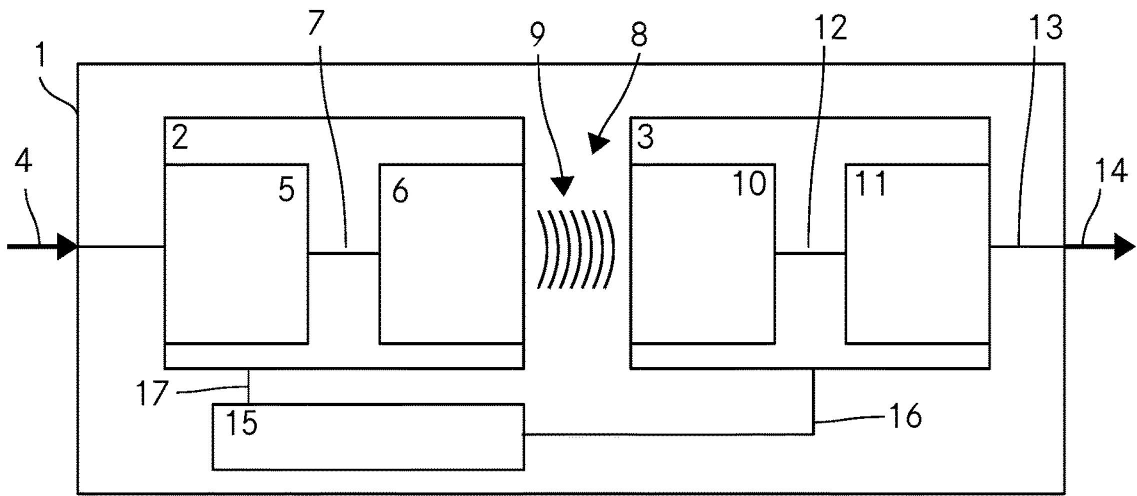
Fig. 1
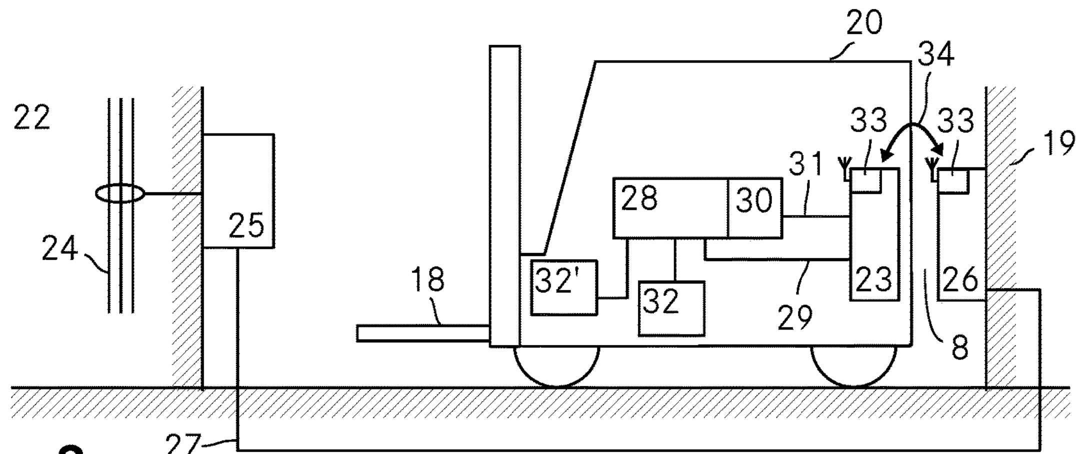
Fig. 2
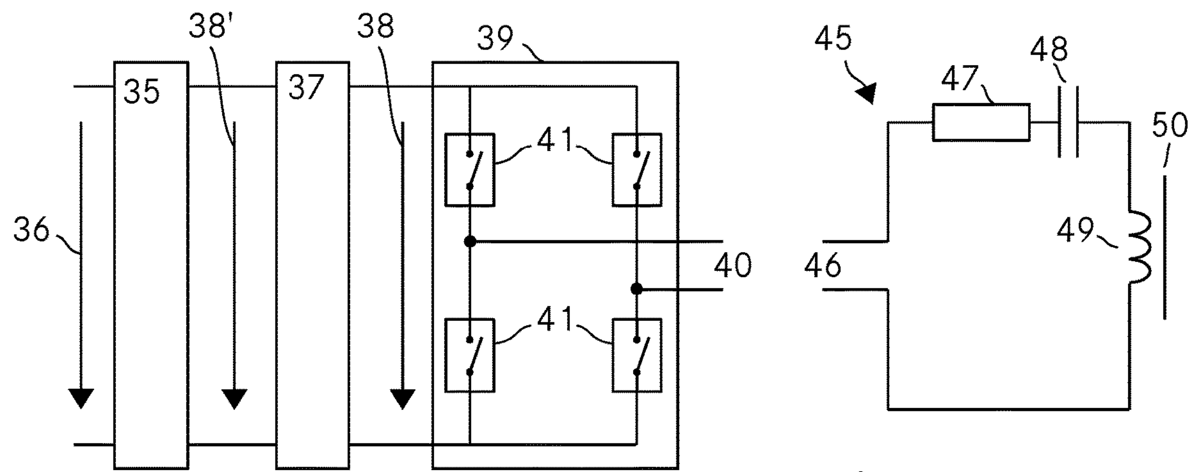
Fig. 3
Fig. 4

WIRELESS POWER TRANSFER CONTROL

TECHNICAL FIELD

The invention relates to a wireless power transfer arrangement including a primary side and a secondary side, the primary side including an input stage for converting an input power to an AC primary output and a primary resonator for receiving the AC primary output and inducing a magnetic field for wireless power transfer, the secondary side including a secondary resonator for converting the power received through the magnetic field to an AC secondary output and an output stage for converting the AC secondary output to a DC secondary output. The invention further relates to a primary arrangement with a primary side of such a charging arrangement, a secondary arrangement with a secondary side of such a charging arrangement and an automotive vehicle including such a secondary arrangement.

BACKGROUND ART

Electrical energy is used in many different applications. To power electrically driven devices, items or objects that are not permanently connected to a source of electrical power, such devices, items or objects are often equipped with one or more batteries that are used to store energy for powering such a device, item or object when it is not connected to a power source. Examples are mobile devices such as cell phones, PDAs (personal digital assistants) and the like, automotive vehicles such as cars, lorries, motorbikes, trains, boats, ships, planes, helicopters and the like but also industrial vehicles such as forklifts, AGVs (automated guided vehicles), cleaning machines, elevators and the like or electrically operated equipment for lifting, displacing or transporting goods of any kind. All these devices, items or objects usually include a battery for operating it. The invention deals with operating such electrical loads and/or charging their batteries.

Whereas Lead-acid batteries have often been used to store power for driving such devices, items or objects, Li-Ion batteries are now often used for this purpose. One of the reasons is that they may be charged with much higher c-rates. Lead-acid batteries may be charged with a c-rate of about 0.1c to 0.2c. This means that a 600 Ah lead-acid battery may be charged with a current of about 60 Amperes to 120 Amperes and would require about 5 to 10 hours. Li-Ion batteries may be charged with a c-rate of up to 1c wherefore a 600 Ah Li-Ion battery may be charged with a current of up to 600 Amperes which reduces the charging time down to about 1 hour. In addition, Li-Ion batteries can be charged occasionally without doing damage to the battery which would happen with Lead-acid batteries when applying multiple short charging cycles for just a small number of minutes.

The high charging currents with Li-Ion batteries may however cause problems with a wire-based charger where the charging current is fed from the power source to the battery via a cable connection where the cable is connected to the source and/or the battery by connectors. The high charging currents would require a charging cable with a large copper diameter and heavy duty connectors. Accordingly, the charging cables are difficult to handle and the connectors would wear out fast. With an occasional charging such connectors would wear out within weeks.

To overcome the problems with the charging cables the charging of such batteries often is done by wireless power transfer. Such a wireless power transfer system is called an inductive power transfer (IPT) system in case the power is transferred wirelessly by inductive coupling. Such IPT Systems do work with loosely coupled inductors.

The primary side of such a wireless power transfer system includes an input stage and a primary pad where the input stage is connected to a power source and typically converts the input power to an AC input power suited as an input for the primary pad which induces a more or less directed magnetic field. The secondary side of such a wireless power transfer system includes a secondary pad and an output stage where the secondary pad is positioned within the magnetic field produced by the primary and the output stage converts the AC power received from the secondary pad to a DC current that is used for charging the battery. To control the charging process the input stage and the output stage usually do communicate with each other either via a wired or a wireless communication link.

The primary and the secondary pad both are resonators with a coil, a flux guiding element and a capacitor. The capacitor forms a resonant circuit with the coil or the resulting inductor respectively when wound on a magnetic core and serves to overcome reactive losses. Both resonators are tuned to the same fixed working frequency. In order to control the power transfer from the primary to the secondary, either the primary resonator is detuned, i. e. the set frequency of the primary current is changed or the current or voltage fed to the primary coil is changed.

However, since the inductances of the coils of the resonators change in dependency of their position relative to each other, the tuned frequency changes with a change of the position of the pads wherefore the power transfer capability of the system changes too. To compensate for such a change of the transferred power, the voltage or current has to be changed as well to meet a given target value for the transferred power.

Accordingly, these dependencies make the control of such a system more difficult or even limit the power transfer capability of the system, wherefore the system margins are usually increased to overcome such limitations. But such an oversizing usually requires extra costs, extra space and extra time and effort.

Document US 2017/0028853 A1 discloses such an IPT System for charging the traction battery of an electric vehicle. The IPT System includes an inverter at the input and a power converter in the vehicle. A controller operates the inverter to control the voltage input to the power converter to drive an impedance phase angle at the inverter output to a predetermined angle and achieve the power demand from the battery management system of the vehicles battery. The control strategy further includes frequency control of the inverter output to adjust the voltage input to the power converter to reduce the converter output power error and the inverter impedance phase angle error. Accordingly, the desired power output of the power converter is controlled by controlling the frequency of the inverter output and by controlling the duty cycle of the power converter which makes it difficult to correctly and efficiently control the power transferred and the battery charging current.

SUMMARY OF THE INVENTION

It is the object of the invention to create a wireless power transfer arrangement pertaining to the technical field initially mentioned, that enables an easier control of the power transferred from the primary to the secondary side of the system. Other objects of the invention are to create a primary and a secondary arrangement for such a wireless power transfer arrangement, a corresponding method for wireless power transfer and an automotive vehicle including such a secondary arrangement.

The solution of the invention is specified by the features of claim 1. In a wireless power transfer arrangement with a primary side and a secondary side, the primary side includes an input stage for converting an input power to an AC primary output and a primary resonator for receiving the AC primary output and inducing a magnetic field for wireless power transfer to the secondary side. The secondary side includes a secondary resonator for converting the power received through the magnetic field from the primary side to an AC secondary output and an output stage for converting the AC secondary output to a DC secondary output.

According to the invention, the wireless power transfer arrangement further includes a control arrangement that is adapted to control independently of each other a frequency of the AC primary output to be at a resonance frequency of the resonators, and the power transferred from the primary side to the secondary side by controlling the voltage or the current of the AC primary output.

The input stage for example includes an AC/AC converter for converting an AC input power to the AC primary output of a suitable amplitude and frequency and the output stage for example includes an AC/DC converter for converting the AC secondary output to the DC secondary output. The input stage may also include a DC/AC inverter for converting a DC input power to the AC primary output or the input stage may include an AC/DC converter for converting an AC input power to a DC intermediate power and a DC/AC inverter for converting the DC intermediate power to the AC primary output.

By independently of each other controlling the frequency and the voltage or the current of the AC primary output, the controlling of the power transferred becomes much easier than in the prior art. By controlling the frequency of the AC primary output to be substantially held at the resonance frequency, the power transfer is easily controlled just by changing the voltage or the current of the AC primary output to achieve the target power output of the AC secondary output to meet for example a target output current. When the primary and the secondary pad change their mutual position, their inductances and also their resonance frequency changes too. So, by controlling the frequency such as to keep the system at resonance, the transfer function of the system is not affected by such a position change and therefore the transferred power can be controlled easily and independently of the frequency control by just controlling the voltage or the current.

Such a wireless power transfer system is preferably used for charging a battery that is arranged at the secondary side and charged by the output current of the AC secondary output. So, the system may be used to deliver the charging current required by a BMS (battery management system) of such a battery to be charged.

Due to the easier control, the power transfer capability of the system is not or at least less limited wherefore no or less oversizing of the system is necessary. Hence, no extra costs, no extra space and no extra time and effort are required.

The invention may be used in different applications where energy has to be transferred wirelessly to a load such as for example a battery. The power transferred to the load may either be used for directly operating the load such as for example an electric motor or it may be used to charge a battery of another energy storage device for later use. The invention may for example be applied to transfer power to electronic mobile devices such as devices for data, speech or video communication like cell phones, computers etc., PDAs (personal digital assistants), navigation devices, mobile music players, torches and the like.

Such mobile devices do however have a low energy usage, at least compared with other applications such as charging the battery of an electric vehicle. Their batteries do have therefore a comparably small capacity. Since the invention is particularly useful in applications with a higher energy consumption, the invention is preferably applied in applications where higher powers have to be transferred to a load such as for example for charging batteries of automotive vehicles such as automobiles, vans, lorries, motorbikes, track-bound or railway vehicles, boats, ships or aircrafts such as planes or rotorcrafts, but also industrial vehicles such as forklifts, pallet jacks, AGVs (automated guided vehicles), cleaning machines, elevators, lifts and the like as well as electrically operated equipment for lifting, displacing or transporting goods of any kind such as cranes, the fork or jack of a forklift or pallet jack and the like. Such equipment may be stationary but is often mounted on a vehicle to move the equipment to the place where it is needed and to move the goods.

The battery to be charged might generally be any type of chargeable battery. The battery may have a capacity from some mAh (milli Ampere hours) to some kAh (kilo Ampere hours) or even higher. And the charging current provided by the output stage of the wireless power transfer arrangement can be as low as some mA (milli Amperes) but can also be as high as some hundred A (Amperes) or even some kA (kilo Amperes) or any current value in between.

However, in a preferred embodiment of the invention, the output stage is adapted to charge a high capacity battery The battery might also be the traction battery of an electic vehicle or a hybrid vehicle using electrical power in addition to for example a combustion engine.

The adaptation of the output stage to charge such a high capacity battery includes for example that the secondary side is able to deliver the required output currents to charge the battery within an acceptable period of time. The secondary as well as the primary side are accordingly equipped with components suitable to process powers higher than some dozens of Ah up to powers in the range of some kAh. Further, the output stage may be arranged in or at such an electrically driven vehicle. In some embodiments, the output stage needs to be powered for operation. In such embodiments, the output stage may be powered via the primary side as long as the secondary side is located within the magnetic field and power is transferred to it. The output stage may however be powered by the battery of the vehicle. Or it may be powered by another vehicles power system which in many cases is a 12 V (Volts) power system that often includes a 12 V battery which is for example used to power the low voltage power system of the vehicle such as interior lighting, a navigation system, a radio communication system, a music player and/or an on-board entertainment system and so on.

In order to deliver an output power covering the above mentioned range for battery capacity from some mAh to some kAh or even above, the wireless power transfer arrangement is preferably adapted to have a working voltage in the input stage between 18 V and up to about 800 V or even 1000 V.

In a preferred embodiment of the invention, the output stage is adapted to charge a Li-Ion traction battery. As outlined above, Li-Ion batteries may be charged with high charging currents, i. e. with a high charging rate. Accordingly, the output stage is preferably adapted to charge such Li-Ion batteries with a charging rate above 0.3c and more preferably with a charging rate above 0.5c and most preferably with a charging rate above 0.8c. For example, in a wireless power transfer arrangement for charging a Li-Ion battery having a capacity of 1200 Ah, the output stage may deliver a charging current of up to 1200 A. However, in order to charge a battery with an even higher capacity the output stage may also be adapted to deliver correspondingly high output currents to charge such high capacity batteries with a high charging rate. But the output stage may also be adapted to deliver low output currents to charge lower capacity batteries or to charge batteries with a higher capacity by a lower charging rate.

The primary resonator as well as the secondary resonator preferably include a coil, a flux guiding element and a capacitor. In the primary, these elements are arranged such as to induce a directed magnetic field where the magnetic field is directed into a direction where the secondary side of the wireless arrangement is positioned when power has to be transferred to it. In the secondary, the coil, the flux guiding element and the capacitor are arranged to form a directed resonator that is directed to best pick up the magnetic field from the primary when power has to be transferred from the primary to the secondary.

In each of the resonators, the coil and the capacitor are preferably connected in series but they may also be connected in parallel. The flux guiding element is for example formed by the magnetic core which is arranged and shaped to direct the magnetic field lines into the direction of the secondary.

The resonators may also include further elements such as resistors and additional capacitors and coils or inductors arranged to improve the power transfer.

The primary and the secondary resonators may show different resonance frequencies. But in a preferred embodiment of the invention, they are both tuned to the same working frequency. This allows to enhance or even optimize the wireless energy transfer through the air gap between the primary and the secondary resonator.

As the control arrangement controls the frequency of the AC primary output to be at the resonance frequency of the primary resonator, this resonance frequency also is the working frequency of the wireless power transfer arrangement which therefore is preferably fixed. Or in other words, the working frequency does typically not change over time except during start-up or shut-down of the system and except for deviations resulting from external disturbances which the control arrangement is trying to compensate for.

In a preferred embodiment of the invention, the controller is adapted to control the frequency of the AC primary output by controlling a phase angle between the voltage and the current of the AC primary output. The phase angle is controlled to be as small as possible but not zero. If the phase angle would become zero, switching losses would be higher and also EMI would be increased. The phase angle is therefore controlled to be higher than a minimum phase angle, wherein the minimum phase angle preferably is equal to or greater than a charging angle $\varphi_c$, with $\varphi_c=\omega t_c$, wherein $\omega$ is an angular frequency of the AC primary output and $t_c$ is a charging time of an internal capacity of the input stage, for example an internal capacity of an inverter at the output of the input stage. This internal capacity may for example be the internal parasitic capacity at the output of an electronic switch or it may also be an additional discrete capacitive component of the input stage.

In order to achieve an efficient operation of an inverter, soft-switching is used to switch the switches in the inverter. Accordingly, the frequency control is done by making sure that the voltage and the current of the AC primary output do have that minimum phase angle. By choosing the minimum phase angle properly, switching losses and EMI can be reduced or even minimised and it can be avoided that the parasitic capacitance of the primary resonator starts oscillating.

In one embodiment of the invention, a fixed value for the minimum phase angle is used which preferably is chosen to be between 5° and 50° and more preferably to be between 15° and 30°. However, the minimum phase angle can also be chosen to be a function of the voltage or the current. The minimum phase angle can for example be chosen to be higher when the voltage is higher or it can be chosen to be lower when the current is higher.

When the frequency of the system is controlled as described above, the electric behaviour of the wireless power transfer arrangement with such loosely coupled coils in series tuning can be described as follows:

$$U_{prim}=I_{sec}*j\omega M$$

$$I_{prim}=U_{sec}*j\omega M$$

where $\omega$ is the angular frequency of the system, $U_{prim}$ is the voltage and $I_{prim}$ is the current of the AC primary output, $U_{sec}$ is the voltage and $I_{sec}$ is the current of the AC secondary output and M is the resulting mutual inductance of the magnetic coupling circuit.

Or in other words, the primary voltage is proportional to the secondary current and the primary current is proportional to the secondary voltage. Hence controlling the power transferred from the primary to the secondary is rather simple by controlling either the current or the voltage of the AC primary output.

Accordingly, the transfer function is linear. And neither this linearity is changed by a frequency control as described above nor is the power balance of the system. It is just the mutual inductance M that might slightly change.

Since voltage control often is easier to implement than current control, the controller in a preferred embodiment of the invention is adapted to control the power transferred from the primary side to the secondary side by controlling the voltage of the AC primary output.

The transferred power is accordingly controlled by controlling the secondary current which means that in case where such a wireless power transfer arrangement is used for charging a battery, the charging current of the system is controlled by adjusting the primary voltage.

In this manner, the frequency is kept at resonance wherefore the frequency control is independent of the power control which is simply done by controlling the primary voltage.

In general, any known voltage regulator may be used to control the primary voltage in the desired way.

In a preferred embodiment of the invention, the controller is adapted to control the voltage of the AC primary output based on a power difference value of the actual output power of the secondary side and the set value for the output power of the secondary side. The power difference value can be either determined by the secondary side, the primary side or an external device.

Another example to control the transferred power is a direct current control where a current error signal is determined by measuring the actual output current and subtracting therefrom the set value for the output current which might be the set value for the charging current of a BMS, transfer the current error signal to the primary side and directly control the transferred power based on that current error signal.

In a preferred embodiment of the invention, the secondary side is adapted to determine the power difference value by determining the actual output power of the output stage and subtracting therefrom the set value for the output power of the output stage. Thereby, the actual output power of the secondary side is determined by measuring an output current and an output voltage of the output stage and calculating the product of the measured output power and the measured output current, and wherein the set value for the output power of the output stage is determined by calculating the product of the measured output voltage of the output stage and the set value for the output current of the output stage.

It is to note that in a battery charging application of the wireless power transfer arrangement the set value for the output current of the output stage is typically provided by the BMS (battery management system) of the battery to be charged where the BMS generates and provides the charging current set value for example based on the actual load status of the battery, the actual load requirements and further parameters as necessary.

A wireless power transfer arrangement according to the invention may however also be used to charge a battery that does not include a BMS. In order to charge a battery that does not include a BMS, the wireless power transfer arrangement may adopt the functions of such a BMS. It may for example include a data storage with a charging profile for the battery to be charged and it may include sensors for measuring battery parameters such as voltage, temperature and the like to define an actually needed charging current. This actually needed charging current may then be used as a set value for the required charging current and may be fed back to the controller of the system to control the arrangement accordingly. It may for example also include means to provide just the right amount of current to the battery to keep the battery voltage constant if the battery has reached a certain voltage.

In another embodiment of the invention, the actual value of the output power of the secondary side is determined by measuring the output power of the AC secondary output.

As already mentioned above, in the case where the power difference value is determined by the secondary side, the secondary side is adapted to provide the power difference value to the primary side. This can be done in different ways, for example via a wired electrical or optical communication link using any suitable communication protocol. Also an optical communication may be used where the optical signals are not transferred via a fibre but through the air.

However, since the power transfer is done wirelessly, it is advantageous to provide a wireless radio communication link between the secondary and the primary side. So, in a preferred embodiment of the invention the primary side and the secondary side each include a transceiver for wireless radio communication with each other. In general, any known type or kind of wireless communication can be used such as for example LTE, Wi-Fi, Bluetooth or the like.

In case of a failure in the secondary such as for example an overload of the battery or in case the battery is separated from the secondary side during the charging process an overvoltage will occur. If such an overvoltage situation occurs, the primary side has to stop operation as fast as possible in order to prevent any further damage.

In another preferred embodiment of the invention, the secondary side therefore includes an overvoltage detector for detecting an overvoltage on the secondary side. And the secondary side is adapted to controllably shorten the secondary resonator in response to an overvoltage detected by the overvoltage detector. When the secondary resonator is shorted the resonance frequency in the primary changes in an instant. This is because when the secondary resonator is shorted, its flux guiding element is taken away which immediately changes the inductance of the primary coil because the part of the magnetic reluctance of the primary resonator formed by the secondary flux guiding element is missing. This change of resonance frequency can be detected in the primary. Once a shorted secondary resonator is detected, the inverter or converter in the primary is shut down to stop operation of the wireless power transfer arrangement and prevent further damage.

Other failures in the secondary include for example a short in the bulk capacitor or a shorted rectifier. Such failures do also result in a short of the secondary resonator. Accordingly, such failures do also change the inductance of the primary coil and may therefore be detected in the primary. And if such a shorted secondary resonator is detected, the inverter or converter in the primary is also shut down to stop operation of the wireless power transfer arrangement and prevent further damage.

The overvoltage detector is preferably implemented using a zener diode that is connected in a detector circuit such that the zener diode starts conducting in case the voltage across it exceeds its breakdown voltage and where the voltage across it is derived in a suitable way from the voltage in the secondary. In order to short the secondary resonator, the secondary side preferably includes a controllable switching arrangement that is arranged across the secondary resonator. The controllable switching arrangement then may be controlled to shorten the secondary resonator when the Zener diode starts conducting in reverse direction. The control signal to control the controllable switching arrangement can be derived directly or indirectly from the cathode of the Zener diode.

The overvoltage detector may however be implemented in other ways. If for example less tolerance is needed than in a detector using a Zener diode, the overvoltage detector may be implemented preferably by using a reference voltage and a comparator which compares the secondary voltage to the reference voltage. If the comparator determines that the secondary voltage exceeds the reference voltage, the comparator controls the controllable switching arrangement to short the secondary resonator.

In a preferred embodiment of the invention, the controllable switching arrangement includes a controllable switch connected across the AC secondary output in order to controllably shorten the secondary resonator. The controllable switch may be a transistor, a thyristor, a triac or any other controllable switch suited to controllably establish a direct electrical connection across the secondary resonator.

In another embodiment of the invention, the rectifier of the output stage is used to shorten the secondary resonator. In case the output stage includes a full bridge rectifier with two parallel branches each including a lower and an upper switching element connected in series, either the two lower or the two upper switching elements are replaced by controllable bidirectional switches that are closed in case of an overvoltage to shorten the secondary resonator.

As mentioned above, when a short in the secondary resonator is detected in the primary, the input stage and therewith the wireless power transfer arrangement is shut down. The detection in the primary of a shorted secondary resonator can be done in different ways.

In one embodiment of the invention, a short of the secondary resonator is detected in the primary by means of an overcurrent protection device which detects an overcurrent in the input stage. In a system with a frequency of about 50 kHz (kilo Herz), such an overcurrent detection usually takes about 40 μs (micro seconds) to about 5 ms (milli seconds).

But in a preferred embodiment of the invention, the primary side includes a jump detector adapted to detect a short of the secondary resonator by detecting a jump of the resonance frequency of the primary resonator. As mentioned above, the resonance frequency in the primary changes when the secondary resonator is shorted. Such a change or jump of the resonance frequency or period respectively then is detected by the jump detector, for example by regularly measuring the frequency or the period of the primary voltage or current and comparing the measured frequency or period and declaring a jump of the resonance frequency if the difference of two successive measurements exceeds a given threshold. In this way, a jump of the resonance frequency can be detected very fast. The jump detector is preferably adapted to detect a jump of a period of the resonance frequency that is greater than 1000 nanoseconds and more preferably by detecting a jump of the period of the resonance frequency that is greater than 300 nanoseconds. In a most preferred embodiment of the invention the jump detector is adapted to detect a jump of a period of the resonance frequency that is greater than 100 ns. With a frequency of about 50 kHz a short in the secondary can preferably be detected within about 20 μs.

In another embodiment, instead of shorting the secondary resonator when an overvoltage situation is detected on the secondary side, the overvoltage is signalled to the primary side by sending a signal to the primary side indicative of an overvoltage situation. Thereby, any suitable communication means may be used including wired or wireless communication means.

The solution of the invention regarding a primary arrangement for a wireless power transfer arrangement is specified in claim 14. The primary arrangement according to the invention includes the primary side of a wireless power transfer arrangement as described herein. The primary arrangement further includes a power input for connection to a mains power supply such as for example available in an industrial, residential or other building, in a warehouse, a logistics centre or in an area for placing or parking automotive and/or industrial vehicles as well as electrically operated equipment or vehicles including such equipment. The primary arrangement is adapted to provide a power received through the power input to the input stage of the primary side and the primary resonator is adapted to induce a magnetic field for wireless power transfer.

Except for the primary resonator, the primary arrangement is preferably included in a housing. The housing is made such as to dispose it on the ground, on a table or other piece of furniture or in a rack or shelf or the like. It is even more preferred that the the primary arrangement is provided in a housing for mounting on a wall which is particularly suited in an application for wireless charging of an electric vehicle such that the housing may be mounted on a wall of a garage or a vehicle hall. In such an application, the primary resonator is for example arranged on the ground or within the ground such that the battery of an electric vehicle properly parked in the garage or vehicle hall can be charged wirelessly. The primary resonator can also be arranged in any other way such as to interact with a secondary resonator of for example an electric vehicle, for example at or in a side or front wall of a garage.

The primary arrangement may however also be included within the housing wherefore the housing is preferably arranged such that the secondary side of such a wireless power transfer arrangement may be positioned such as to enable the wireless power transfer power from the primary to the secondary.

The solution of the invention regarding a secondary arrangement for a wireless power transfer arrangement is specified in claim 15.

The secondary arrangement according to the invention includes the secondary side of a wireless power transfer arrangement as described herein. The secondary arrangement further is adapted to receive power through the magnetic field induced by the primary side of a wireless power transfer arrangement as described herein to charge the battery of a vehicle or equipment as described hereinbefore where the primary side is arranged external to the vehicle or equipment.

The secondary arrangement is therefore preferably adapted for mounting in an automotive vehicle or electrically operated equipment including a battery and an electrically load fed by power stored in the battery, where the secondary resonator may be arranged within the vehicle or equipment such that it may pick up the magnetic field induced by the primary resonator of a wireless power transfer arrangement as described herein when the vehicle or equipment is properly positioned near the primary resonator.

The solution of the invention regarding an automotive vehicle including a secondary arrangement for a wireless power transfer arrangement is specified in claim 16. An automotive vehicle according to the invention includes a traction battery and an electrically driven traction motor fed by power stored in the traction battery. It further includes a secondary arrangement as previously described and arranged within the vehicle such as to pick up the magnetic field induced by the primary side of a wireless power transfer arrangement as described herein when the vehicle is properly positioned near the primary side. In order to control the charging of the traction battery the vehicle usually includes a BMS which for example controls the charging process by defining the charging current required at a particular moment. This charging current given by the BMS then is used by the secondary arrangement to determine the set value for the charging power and therewith for controlling the primary arrangement to deliver the charging power needed to achieve the required charging current.

The solution of the invention regarding a method for wireless power transfer is specified in claim 17. A method for wireless power transfer includes the following steps

- converting with an input stage an input power to an AC primary output,
- receiving with a primary resonator the AC primary output,
- inducing with the primary resonator a magnetic field for wireless power transfer,
- receiving with a secondary resonator the power through the magnetic field,
- converting with the secondary resonator the power received to an AC secondary output and
- converting the AC secondary output with an output stage to a DC secondary output.

The method according to the invention further includes the step of controlling with a control arrangement the wireless power transfer arrangement by controlling independently of each other a frequency of the AC primary output to be at a resonance frequency of the primary resonator, and the power transferred from the primary side to the secondary side by controlling the voltage or the current of the AC primary output.

Other advantageous embodiments and combinations of features come out from the detailed description below and the entirety of the claims.

BRIEF DESCRIPTION OF THE DRAWINGS

The drawings used to explain the embodiments show:

FIG. 1 A schematic representation of a first embodiment of a wireless power transfer arrangement according to the invention, FIG. 2 a schematic representation of an application of a wireless power transfer arrangement according to the invention for charging a vehicle, FIG. 3 a schematic representation of an input stage of a wireless power transfer arrangement according to the invention, FIG. 4 a schematic representation of a primary resonator of a wireless power transfer arrangement according to the invention, FIG. 5 a schematic representation of a secondary resonator of a wireless power transfer arrangement according to the invention, FIG. 6 a schematic representation of an output stage of a wireless power transfer arrangement according to the invention, FIG. 7 a schematic representation of a part of the power control carried out by the secondary side, FIG. 8 a schematic representation of a part of the power control carried out by the controller, FIG. 9 a schematic representation of a part of the frequency control, FIG. 10 a schematic representation of a timing diagram of the frequency control and FIG. 11 a schematic representation of the overvoltage protection as used in the invention.

In the figures, the same components are given the same reference symbols.

PREFERRED EMBODIMENTS

Figure 5:
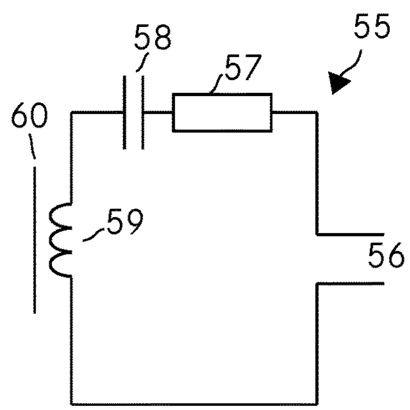

FIG. 1 shows a schematic representation of a first embodiment of a wireless power transfer arrangement 1 according to the invention. The wireless power transfer arrangement 1 includes a primary side 2, a secondary side 3 and a controller 15 which is shown to be separated from the primary side 2 and the secondary side 3. The primary side 2 includes an input stage 5 for converting an input power 4 into an AC primary output power 7 which is fed to a primary resonator 6. The primary resonator 6 induces a magnetic field 9 to wirelessly transmit power across an airgap 8. The secondary side 3 includes a secondary resonator 10 which picks up the magnetic field 9 and converts the power received through the magnetic field 9 into an AC secondary output 12. An output stage 11 is connected to the secondary resonator 10 and converts the AC secondary output 12 to a DC secondary output 13 which is then provided at an output of the wireless power transfer arrangement 1 as an output power 14.

The controller 15 controls the power transfer from the primary side 2 to the secondary side 3 over the airgap 8 such as to meet the requirements of a particular application. The controller 15 controls the primary side 2 for example to meet a certain output power 14 needed by a device connected to the output stage 11. Here, the controller receives some input 16 from the secondary side 3 and based on this input signal 16 generates control signals 17 to control the primary side 2 such as to induce a magnetic field 9 to meet the required power at the output of the wireless power transfer arrangement 1. The input signal 16 may for example be a signal representing the power difference between the power outputted by the output stage 11 and the set value for the output power of the output stage 11. The input signal 16 may however also be just a measured value such as for example the actual power, current or voltage at the output stage 11 where the controller 15 therefrom calculates the control signals 17. To do so, the controller 15 also knows the set value for the power, the current or the voltage or the set value is inputted to the controller 15.

The input stage for example includes an AC/AC converter with an AC/DC stage, a DC link and a DC/AC inverter. In such a configuration, the control signals 17 include the signals to control the input stage by providing the control signals 17 for switching the switches of the inverter. But the controller 15 not only controls the switches of the inverter, but also its frequency to compensate for any changes of the mutual position of the primary 6 and secondary 10 resonator.

The input stage may however be implemented in other ways. The input stage may for example include three sub-stages. A first sub-stage may include an AC/DC converter with a PFC (power factor correction) to convert the mains AC power to a first DC power. The second sub-stage may include a DC/DC converter to provide a second, variable DC power based on the first, fixed DC power. In this example, the second DC power is proportional to the required load current and accordingly, the control signals 17 would include the information to control the DC/DC converter to provide the variable second DC power such that the required charging current is outputted at the output of the charging system. The third sub-stage may include a DC/AC inverter that converts the second, variable DC power into a variable AC power that is fed to the primary resonator.

Whereas the controller 15 is shown to be a separate unit it may also be integrated into any of the units shown in FIG. 1. It may also be split into two or more controller units to control the frequency and the switches and possible also other functions of the wireless power transfer arrangement 1 or even the function of other devices.

FIG. 2 shows a schematic representation of an application of a wireless power transfer arrangement according to the invention as a charging arrangement for charging a vehicle shown as a forklift 20. The input stage and the controller of the charging arrangement are in this embodiment arranged in a wallbox 25 which is mounted on a wall of the premises 22 and connected to the power supply network 24 within the premises 22.

The primary resonator 26 is mounted on another wall 19 of the premises 22, for example the wall 19 of a garage, a car port, a parking area 21 or the like in or near the premises 22 and is connected to the wallbox 25 by means of a fixed cable 27. The primary resonator 26 may be integrated partly or fully into the wall 19 such that it would require less or no extra space near the wall 19. The primary resonator 26 may also be mounted on the same wall as the wallbox 25. Or the primary resonator and the wallbox 25 may be integrated into the same housing. The primary resonator 26 may also be arranged horizontally on the ground of the garage, car port, parking area 21 or the like. A forklift 20 includes an electric motor 32 for driving the forklift 20 and a battery 28 for powering the electric motor 32. A battery management system BMS 30 manages the energy flow into and usually also out of the battery 28. The forklift 20 includes a further electric motor 32' used for driving the lift 18 of the forklift 20 and powered by the battery 28.

The forklift 20 further includes the secondary side 23 of the charging arrangement that is connected to the battery 28 for providing the charging current via the charging line 29 and the secondary side 23 is also connected to the BMS 30 by signal line 31. For charging the battery 28 the BMS 30 defines the charging current allowed or needed at a particular point in time and provides this set value to the secondary side 23 via the signal line 31. The secondary side 23 for example measures the actual current provided to the battery 28, compares the actual current with the set current and calculates therefrom an error signal that is transmitted to the wallbox 25 via a wireless communication link 34 established by the wireless transceivers 33 included in the secondary side 23 as well as in the primary resonator 26.

Based on this current set value the controller then controls the input stage such that the power transferred from the primary resonator 26 through the airgap 8 to the secondary side 23 results in a charging current provided to the battery 28 via the charging line 29 matches the set value of the BMS 30.

In order to communicate the control information from the secondary side via primary pad to the controller, the primary resonator 26 is further connected to the wallbox 25 via an additional wired or even wireless communication link. The additional communication link may also be established using the fixed cable 27 as the transmission medium. The wireless transceiver 33 of the primary side may however also be provided within the wallbox 25.

FIG. 3 shows a schematic representation of an input stage of a wireless power transfer arrangement according to the invention. The input stage is connected to an AC power source providing an AC input power 36. An AC/DC converter 35 converts the AC input power 36 to a fixed DC intermediate power 38' which then is converted by a DC/DC converter 37 to a variable DC intermediate power 38. The fixed DC intermediate power 38' may for example be power at 800

V and the variable DC intermediate power 38 may for example be a DC power between 0 V and 800 V, depending on the actual power need at the secondary. The variable DC intermediate power 38 is fed to an inverter 39 that converts the variable DC power 38 to an AC output power 40. For converting the variable DC intermediate power 38 to the AC output power 40, the inverter 39 includes four controllable switches 41 in a full bridge configuration. As previously mentioned, soft switching may be used for an efficient operation of the inverter 39. Instead of providing an additional DC/DC stage between the AC/DC converter and the DC/AC inverter for controlling the voltage, the DC/AC inverter may be used for voltage control. In this case however soft switching may not be used anymore to switch the switches of the DC/AC inverter.

The frequency and the amount of power provided at the output power 40 can be controlled by controlling the switching of the switches 41, for example by a PWM (pulse width modulation) where not only the duty cycle but also the frequency of the pulses is controlled.

Accordingly, the frequency control of the power transfer system is done by controlling the frequency of the inverter 39 and to control the power transferred the DC/DC converter is controlled such as to provide the required variable DC intermediate power 38 at the input of the inverter 39. In this way, frequency control and voltage control can be done independently of each other and control of the system becomes much easier than in the prior art.

MOSFETs (metal oxide semiconductor field effect transistors) are often used as controllable switches in such converters and are also preferably used in the invention. However, other types and kinds of controllable switches such as other transistors, thyristors or triacs may be used.

The input stage may not only include those elements shown in FIG. 3, but usually also includes further elements such as filters etc. to optimise its operation.

Generally, different types of input stages may be used in a wireless power transfer arrangement according to the invention as long as it converts the input power provided into an AC output power where the frequency and the output power may be controlled.

FIG. 4 shows a schematic representation of a primary resonator 45 for use in a wireless power transfer arrangement according to the invention. The primary resonator 45 may for example be connected to an input stage as shown in FIG. 3 such that it receives an AC input power 46 at its input.

The primary resonator 45 essentially includes a tuned circuit with a resistor 47, a capacitor 48 and a coil 49 connected in series. By applying an AC power to the input of the primary resonator 45, the primary resonator 45 starts to oscillate thereby inducing a magnetic field that is emitted into the zone around the resonator. The shape, the run and the distribution of the magnetic field lines may however be influenced by certain measures. So, one or more field guiding elements, here in the form of a magnetic core 50 are provided to direct the magnetic field into a direction as desired by the particular application. Usually, the magnetic field lines are modified such that most of the energy transferred into the magnetic field may be picked up by the receiving resonator in order to reduce or minimise losses.

FIG. 5 shows a schematic representation of a secondary resonator 55 as used in the invention. The secondary resonator 55 may for example be used to pick up the magnetic field of the primary resonator 45 as shown in FIG. 4.

The secondary resonator 55 largely corresponds to the primary resonator 45. It essentially also includes a tuned circuit with a resistor 57, a capacitor 58 and a coil 59 connected in series. By properly arranging the secondary resonator 55 within the magnetic field produced by the primary resonator 45, it may pick up the energy transferred via the magnetic field and convert it to an AC output power 56 provided at its output. In order to pick up as much energy from the magnetic field, i. e. as much of the magnetic field lines as possible, the secondary resonator also includes one or more flux guiding elements, here also in the form of a magnetic core 60.

Figure 6:
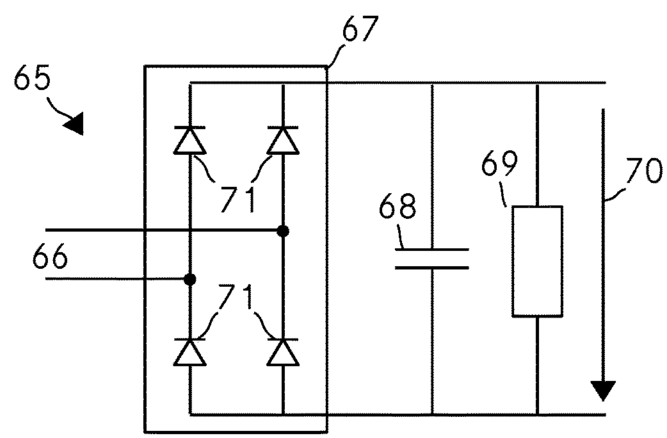

FIG. 6 shows a schematic representation of an output stage of a wireless power transfer arrangement according to the invention. The output stage includes an AC/DC converter 65 that is connected to the output of a secondary resonator such as the secondary resonator 55 shown in FIG. 5. The AC/DC converter 65 converts an AC power 66 received at its input to a DC output power 70 provided at its output. In this embodiment of the invention, the AC/DC converter includes a rectifier 67 with four rectifying elements in a full bridge configuration, here four diodes 71, followed by a bulk capacitor 68 and an output filter 69 to shape the DC output power 70.

Of course, the rectifier 67 may also be implemented using synchronous rectifiers such as FETs (field effect transistor) or the like.

The DC output power 70 provides a DC current at a specific DC voltage which can be used for various purposes. One of the main applications as already described above is the application of such a wireless power transfer arrangement as a charger for charging a battery such as the traction battery of an electric vehicle. Such a wireless power transfer arrangement may however be used in any other application requiring a controllable DC input power such as for example handheld or other mobile devices that need electric power to be operated such as for example phones, electric toothbrushes etc. The invention is usually however used in applications that need more energy to be operated and therefore include batteries with a higher capacity such as some dozens, hundreds or even thousands of Ah.

The AC/DC converter 65 may also include further elements not shown in FIG. 6.

Generally, different types of converters may be used to convert the AC input provided by the secondary resonator into a DC output. The DC output may also be stepped up or down as required by the particular application. And it would also be possible to again convert the DC output into an AC output with given characteristics as required by the particular application.

Figure 7:
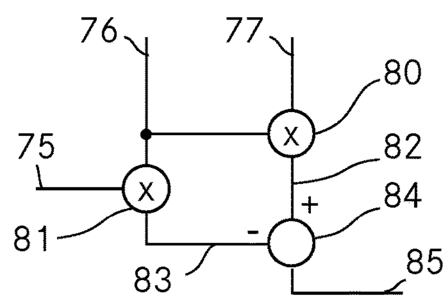

FIG. 7 shows a schematic representation of a part of the power control carried out by the secondary side. The secondary side in this example carries out the computation of the power error value 85 for controlling the input stage such as to meet the set value for the output power of the secondary side. A microprocessor, an FPGA (field programmable gate array), a programmable logic device or another logic device capable of carrying out such computations receives the set value for the output power of the output stage, in this case a set current 75 from a BMS of a battery to be charged. Further, the secondary side includes sensors or measurement devices to measure the output voltage 76 and the output current 77 of the output stage. A multiplier 80 forms the product of the output voltage 76 and the output current 77 to receive the actual output power 82. Another multiplier 81 forms the product of the actual output voltage 76 and the set current 75 to receive the set output power 83. Then, an adder subtracts the set output power 83 from the actual output power 82 to determine the power error value 85.

Instead of a microprocessor, an FPGA (field programmable gate array), a programmable logic device or other logic device, such an error value determination could also be implemented in hardware.

Figure 8:
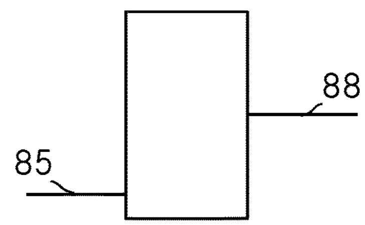

FIG. 8 shows a schematic representation of a part of the power control carried out by the controller. The controller receives the power error value 85 and, depending on this power error value 85 generates the control signals 88 for the switches of the converter of the input stage. This can be done by a voltage controller or a current controller as known in the art.

In another embodiment the secondary side does not determine a power error value but a power set value for the output power of the primary side. In this case, based on the power error value 85 the secondary side calculates a power set value which is then transferred to the controller. The controller receives the actual output power of the primary side, which is for example determined by measuring the input voltage and the input current of the primary resonator and forming their product, and then subtracts the actual output power from the power set value received from the secondary side. Then the resulting power error value is used for a voltage or current controller to control the input stage.

Figure 9:
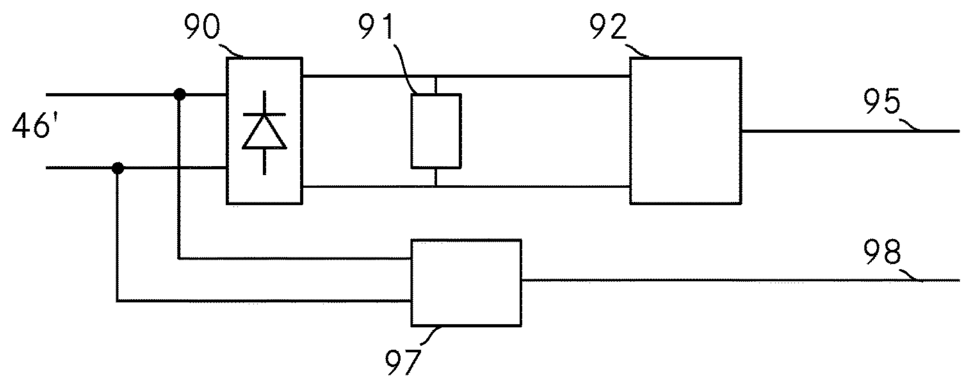

FIG. 9 shows a schematic representation of a part of the frequency control carried out by the controller. The controller determines a square wave signal 98 that is positive during the positive half waves of the input current 46' of the primary resonator. The input current 46' of the primary resonator is fed to a comparator 97 to detect the zero crossings of the primary resonator current in order to generate the square wave signal 98.

The input current 46' of the primary resonator is further fed via a rectifier 90 to a burden resistor 91. A conversion device 92 such as a current transformer, a current transducer or the like is connected across the burden resistor 91 to provide at its output a signal 95 that is representative of the current flowing into the primary resonator. This signal is for example used to detect an overcurrent situation in the primary.

Figure 10:
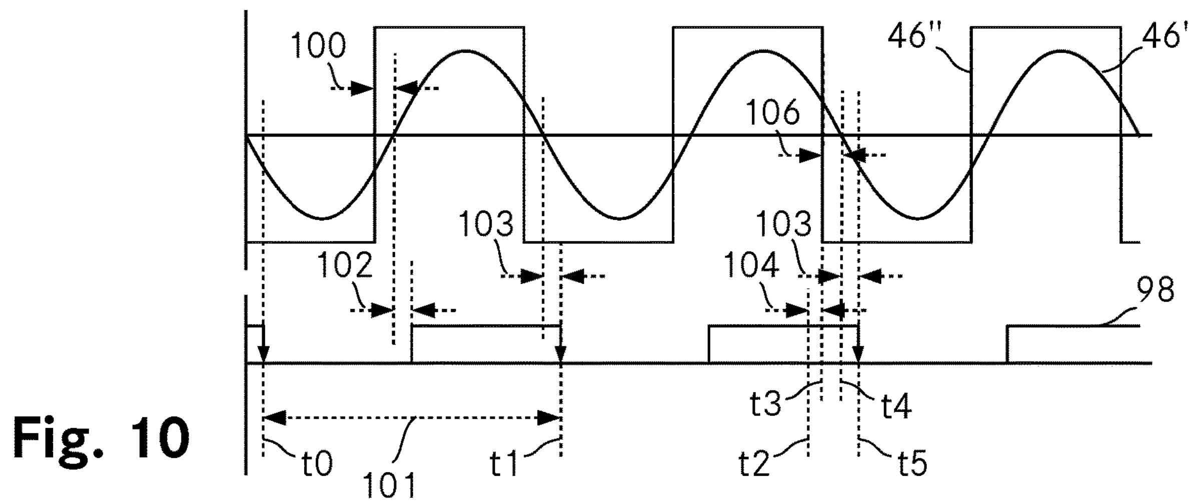

Based on the square wave signal 98 the controller controls the frequency of the output of the input stage as shown in FIG. 10. FIG. 10 shows a schematic representation of a timing diagram of the frequency control. The upper half of FIG. 10 shows the input voltage 46" and the input current 46' of the primary resonator. As can be seen, the input voltage 46" and the input current 46' are offset by a phase angle 100 which should best possibly match the desired phase angle 106. The desired phase angle 106 should be as small as possible but big enough to ensure proper operation of the circuit as previously described. In the lower half of FIG. 10 the square wave signal 98 is shown which, as can be seen, is positive during the positive half waves of the input current 46' and is zero otherwise.

In a first step, the period 101 of the square wave signal 98 is measured with a microprocessor or another logic device. The period 101 corresponds to the time interval t1−t0. And as can be seen in FIG. 10, there is a first delay 102 from the actual zero crossing of the input current 46' and the point in time where the square wave signal 98 goes high. And there is a second delay 103 from the actual zero crossing of the input current 46' and the point in time where the square wave signal 98 goes down. This second delay 103 can also be seen as the time interval t5−t4. A third delay 104 occurs from the point in time t2 at which the controller sets the control signals for the switches and the point in time t3 at which the input voltage 46" actually changes its polarity.

These delays 102, 103, 104 are either known or can be determined by measuring in advance. The delays 102, 103 can be identical or they can differ from each other.

Now, based on the knowledge of the period 101, the propagation delays 102, 103, 104 and the desired phase angle 106 the microprocessor or logic device can determine the timing for setting the switch control signals for the input stage. This is done by starting a timer at t1 which corresponds to the length of the period 101 and setting the control signals for the switches at a time prior to the expiration of the timer such that the voltage, after expiration of the different delays, changes its polarity with the desired phase angle to the current. This point in time for the controller to set the control signals is the time t2 and the time interval to set the control signals prior to the end of the timer is t5−t2 and is calculated as follows:

$$t5-t2=\text{delay } 103+\text{desired phase angle } 106+\text{delay } 104$$

Accordingly, the microprocessor or other logic device measures the period 101, calculates the time interval t5−t2 and sets the switch control signals for the next half period at t5−t2 prior to the expiration of the timer and so on. The reference period for the length of the timer is always the preceding period as measured before.

Further, a frequency monitoring can be implemented by analysing the periods as measured successively which allows to realise a jump detector to detect changes in the period that are above a tolerated value and are therefore judged to signal an error of the system. Such an error may for example be a short of the secondary resonator.

If the absolute value of the difference between a measured period $T_n$ and the previous measured period $T_{n-1}$ is smaller than a tolerated delta $\Delta T$ $$|T_n - T_{n-1}| < \Delta T,$$

everything is judged to be OK and the system is further operated. If the difference is however larger than the tolerated delta $\Delta T$:

$$|T_n - T_{n-1}| > \Delta T,$$

then this is judged to signal an error of the system and the system is stopped to avoid further damage.

If for example the period of the primary current is 25 μs then an error is declared by the controller if $\Delta T$ is for example larger than 1 μs. As previously discussed, a short at the secondary resonator is visible in the primary as a change of the frequency in an instant. By such a frequency monitoring, such a secondary short can be detected very fast. Contrary to that, the primary current needs many cycles to get a higher amplitude in case of a secondary short wherefore detection of such a secondary short by monitoring the current amplitude will take much longer and increase the chances of further damage.

Figure 11:
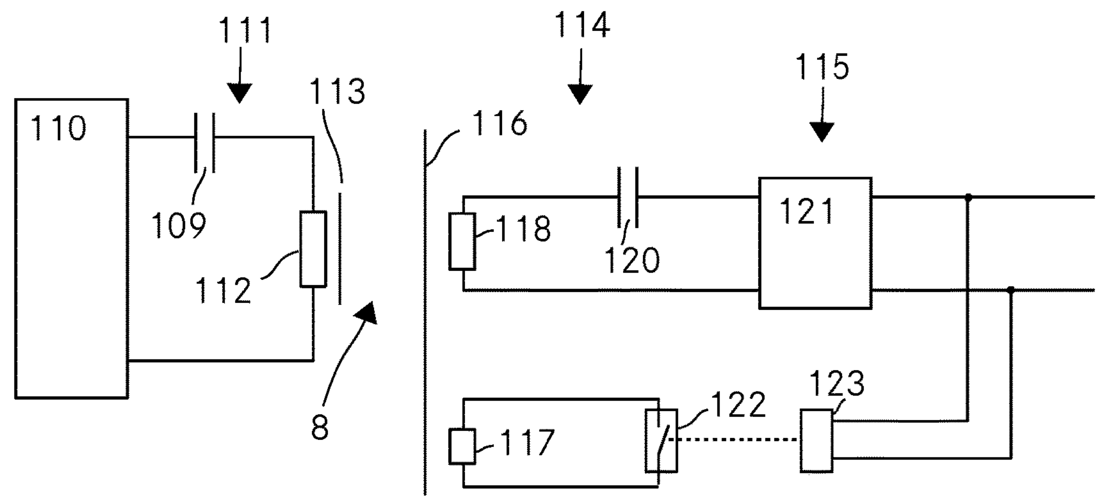

FIG. 11 shows a schematic representation of another embodiment of the invention including an overvoltage protection. FIG. 11 shows the primary side of a wireless power transfer arrangement with an input stage 110 and a primary resonator 111 which in this embodiment includes a resonator circuit that includes a capacitor 109 and a primary coil 112 connected in series. The primary coil 112 is wound on a magnetic core 113. The magnetic core 113 is used as a flux guiding element to direct the induced magnetic field across the airgap 8 towards the secondary resonator 114.

The secondary resonator 114 in this embodiment includes a resonator circuit with a resonating coil 118 and a resonating capacitor 120 connected in series, where the resonating coil 118 is wound on a magnetic core 116.

The output stage 115 includes an AC/DC converter 121 connected to the secondary resonator 114 to provide the required output power.

FIG. 11 also shows an overvoltage protection in the secondary. The secondary side further includes a shorting winding 117 which is also wound on the magnetic core 116. A switch 122 is connected across the shorting winding 117. An overvoltage protection device 123 is connected across the output of the AC/DC converter 121 and is adapted to detect an overvoltage occurring in the secondary. The overvoltage protection device 123 for example is realised with a comparator that compares the output voltage of the AC/DC converter 121 to a reference voltage where an overvoltage is detected if the output voltage of the AC/DC converter 121 exceeds the reference voltage just once for a rather short time or for example for a given period of time. The switch 122 is normally open, but if the overvoltage protection device 123 actually does detect an overvoltage, it closes the switch 122 immediately. The switch 122 may be any electrically controllable switch but may preferably a thyristor, a triac or the like. As previously described, such a shorting of the secondary resonator instantly leads to a change of the frequency in the primary. Such a frequency change then is detected in the primary as described in connection with FIG. 10 and the system is shut down.

In summary, it is to be noted that the invention enables to build a wireless power transfer arrangement which can be easily controlled because two parameters can be controlled independently of each other, namely the frequency of the system to remain at the resonance frequency of the resonators and then the transferred power by controlling the voltage or the current in the primary resonator such that the resulting output power of the wireless power transfer arrangement meets the power needs of the device to which the secondary side has to provide the power. The invention further enables to signal an error situation in the secondary in a very fast and efficient way to the primary such that the primary can be shut down fast to avoid further damage.

The invention claimed is:

1. A wireless power transfer arrangement for wireless charging of a battery, comprising:

a primary side and a secondary side, wherein the primary side includes i) an input stage for converting an input power to an AC primary output, wherein the input stage includes an inverter with controllable switches to provide the AC primary output, and ii) a primary resonator for receiving the AC primary output and inducing a magnetic field for wireless power transfer, and wherein the secondary side includes i) a secondary resonator for converting the power received through the magnetic field to an AC secondary output and ii) an output stage for converting the AC secondary output to a DC secondary output; and a controller adapted to control a frequency of the AC primary output to be at a resonance frequency of the primary resonators by controlling a switching of the controllable switches of the inverter such that a phase angle between the voltage and the current of the AC primary output is as small as possible but equal to or higher than a minimum phase angle, and the power transferred from the primary side to the secondary side by controlling the voltage or the current of the AC primary output.

2. The wireless power transfer arrangement according to claim 1, wherein the output stage is coupled to a battery, wherein the output stage delivers a charging power to charge the battery.

3. The wireless power transfer arrangement according to claim 2, wherein the output stage is coupled to a Li-Ion traction battery, wherein the output stage provides the Li-Ion traction battery with a charging rate above 0.3c.

4. The wireless power transfer arrangement according to claim 1, wherein the primary resonator and the secondary resonator includes a coil, a flux guiding element and a capacitor.

5. The wireless power transfer arrangement according to claim 1, wherein the primary and the secondary resonator are tuned to a same working frequency.

6. The wireless power transfer arrangement according to claim 1, wherein the controller is adapted to control the power transferred from the primary side to the secondary side by controlling the voltage of the AC primary output.

7. The wireless power transfer arrangement according to claim 1, wherein the controller is adapted to control the voltage of the AC primary output based on a power error value of an actual output power of the secondary side and a set value for the output power of the secondary side.

8. The wireless power transfer arrangement according to claim 7, wherein the secondary side includes a logic device that determines the power error value by determining the actual output power of the output stage and subtracting therefrom the set value for the output power of the output stage, wherein the actual output power of the output stage is determined by a measurement circuit that measures an output current and an output voltage of the output stage and calculating the product of the measured output current and the measured output voltage, and wherein the set value for the output power of the output stage is determined by a processor circuit that calculates_the product of the measured output voltage of the output stage and the set value for the output current of the output stage.

9. The wireless power transfer arrangement according to claim 1, wherein the primary side and the secondary side each include a transceiver for wireless communication with each other.

10. The wireless power transfer arrangement according to claim 1, wherein the secondary side includes an overvoltage detector and a controllable switching arrangement to controllably shorten the secondary resonator in response to an overvoltage detected by the overvoltage detector.

11. The wireless power transfer arrangement according to claim 10, wherein the controllable switching arrangement includes a controllable switch connected across the AC secondary output.

12. The wireless power transfer arrangement according to claim 1, wherein the primary side includes a jump detector adapted to detect a short of the secondary resonator by detecting a jump of the resonance frequency of the primary resonator.

13. The wireless power transfer arrangement according to claim 1 further including a primary arrangement in a housing that houses the primary side and a power input for connection to a mains power supply, wherein the primary arrangement is adapted to provide a power received through the power input to the input stage of the primary side, and the primary resonator is adapted to induce a magnetic field for wireless power transfer.

14. The wireless power transfer arrangement according to claim 1 further including a secondary arrangement for mounting in an automotive vehicle or electrically operated equipment including a battery and an electrically driven load fed by power stored in the battery, wherein the secondary side is adapted to receive power through a magnetic field induced by the primary that is external to the vehicle or equipment to charge the battery of the vehicle or equipment.

15. The wireless power transfer arrangement according to claim 14, wherein the battery is a traction battery and wherein the automotive vehicle includes an electrically driven traction motor fed by power stored in the traction battery, wherein the secondary side charges the traction battery.

16. A method for wireless power transfer for wireless charging of a battery, including the steps of converting with an input stage an input power to an AC primary output using an inverter having controllable switches, receiving with a primary resonator the AC primary output, inducing with the primary resonator a magnetic field for wireless power transfer, receiving with a secondary resonator the power through the magnetic field, converting with the secondary resonator the power received to an AC secondary output and i) converting the AC secondary output with an output stage to a DC secondary output, controlling with a controller the wireless power transfer arrangement by controlling frequency of the AC primary output to be at a resonance frequency of the primary resonator such that by controlling a switching of the controllable switches of the inverter such that a phase angle between the voltage and the current of the AC primary output is as small as possible but equal to or higher than a minimum phase angle, and ii) the power transferred from the primary side to the secondary side by controlling the voltage or the current of the AC primary output.

17. The wireless power transfer arrangement according to claim 3, wherein the output stage provides the Li-Ion traction battery with a charging rate above 0.5c.

18. The wireless power transfer arrangement according to claim 1, wherein the minimum phase angle is equal to or greater than a charging angle $\varphi_c$, with $\varphi_c=\omega t_c$, wherein $\omega$ is an angular frequency of the AC primary output and $t_c$ is a charging time of an internal capacity of the input stage.

19. The wireless power transfer arrangement according to claim 18, wherein $t_c$ is the charging time of the internal capacity of the inverter.

20. The wireless power transfer arrangement according to claim 9, wherein the primary side and the secondary side each include a transceiver for radio communication using LTE, Wi-Fi or Bluetooth.

21. The wireless power transfer arrangement according to claim 10, wherein the overvoltage detector includes a reference voltage and a comparator for comparing a secondary side voltage to the reference voltage for detecting the overvoltage.

22. The wireless power transfer arrangement according to claim 11, wherein the controllable switch includes a thyristor or a triac.

23. The wireless power transfer arrangement according to claim 12, wherein said short of the secondary resonator is detected by detecting a jump of a period of the resonance frequency that is greater than 300 nanoseconds.

24. The wireless power transfer arrangement according to claim 13, wherein the primary arrangement is included in a housing.

* * * * *